United States Patent
Burford et al.

(10) Patent No.: US 7,221,869 B1
(45) Date of Patent: May 22, 2007

(54) SYSTEM AND METHOD FOR CLASSIFYING HIGH SPEED DATA SIGNALS UTILIZING LOW FREQUENCY ELECTRICAL SPECTRAL CHARACTERISTICS

(75) Inventors: Robert Burford, McKinney, TX (US); David J. Butler, Richardson, TX (US); Kurt Schuder, Dallas, TX (US)

(73) Assignee: Alcatel Lucent, Paris (FR)

( * ) Notice: Subject to any disclaimer, the term of this patent is extended or adjusted under 35 U.S.C. 154(b) by 779 days.

(21) Appl. No.: 10/175,192

(22) Filed: Jun. 19, 2002

(51) Int. Cl.
*H04B 10/08* (2006.01)
*H04B 17/00* (2006.01)

(52) U.S. Cl. ....................................................... 398/25
(58) Field of Classification Search ................... 398/25, 398/34
See application file for complete search history.

(56) References Cited

U.S. PATENT DOCUMENTS

| | | | |
|---|---|---|---|
| 5,805,319 A | 9/1998 | Chuzenji et al. | |
| 6,178,025 B1 | 1/2001 | Hardcastle et al. | |
| 6,493,088 B1 * | 12/2002 | Hui et al. | 356/450 |
| 6,501,258 B1 * | 12/2002 | Levitt et al. | 324/76.37 |
| 2002/0130256 A1 | 9/2002 | Macki et al. | |

FOREIGN PATENT DOCUMENTS

WO    WO 00/25451    * 5/2000

OTHER PUBLICATIONS

Yang, W. et al, "Sonet Framing Recoginition Using Modulation Domain Analysis" IEEE Photonics Technology Letters, IEEE Inc., New York, US< vol. 13, No. 10, Oct. 2001, pp. 1127-1129—XP001068986.

* cited by examiner

*Primary Examiner*—Shi K. Li
(74) *Attorney, Agent, or Firm*—Jessica W. Smith; V. Lawrence Sewell

(57) ABSTRACT

A system for identifying transmission rates of an optical signal transmitted in an optical communication network includes a signal converter for converting a sample of the optical signal to an electrical signal. A frequency analyzer analyzes the electrical signal to determine energy levels of the signal at predetermined frequencies. The detected energy levels are stored in a first memory device. A second memory device stores known energy levels at predetermined frequencies for a plurality of known optical transmission standards. A comparator receives the detected energy levels stored in the first memory device and compares this information to the known transmission standards stored in the second memory device in order to identify the data transmission standard of the optical signal.

3 Claims, 1 Drawing Sheet

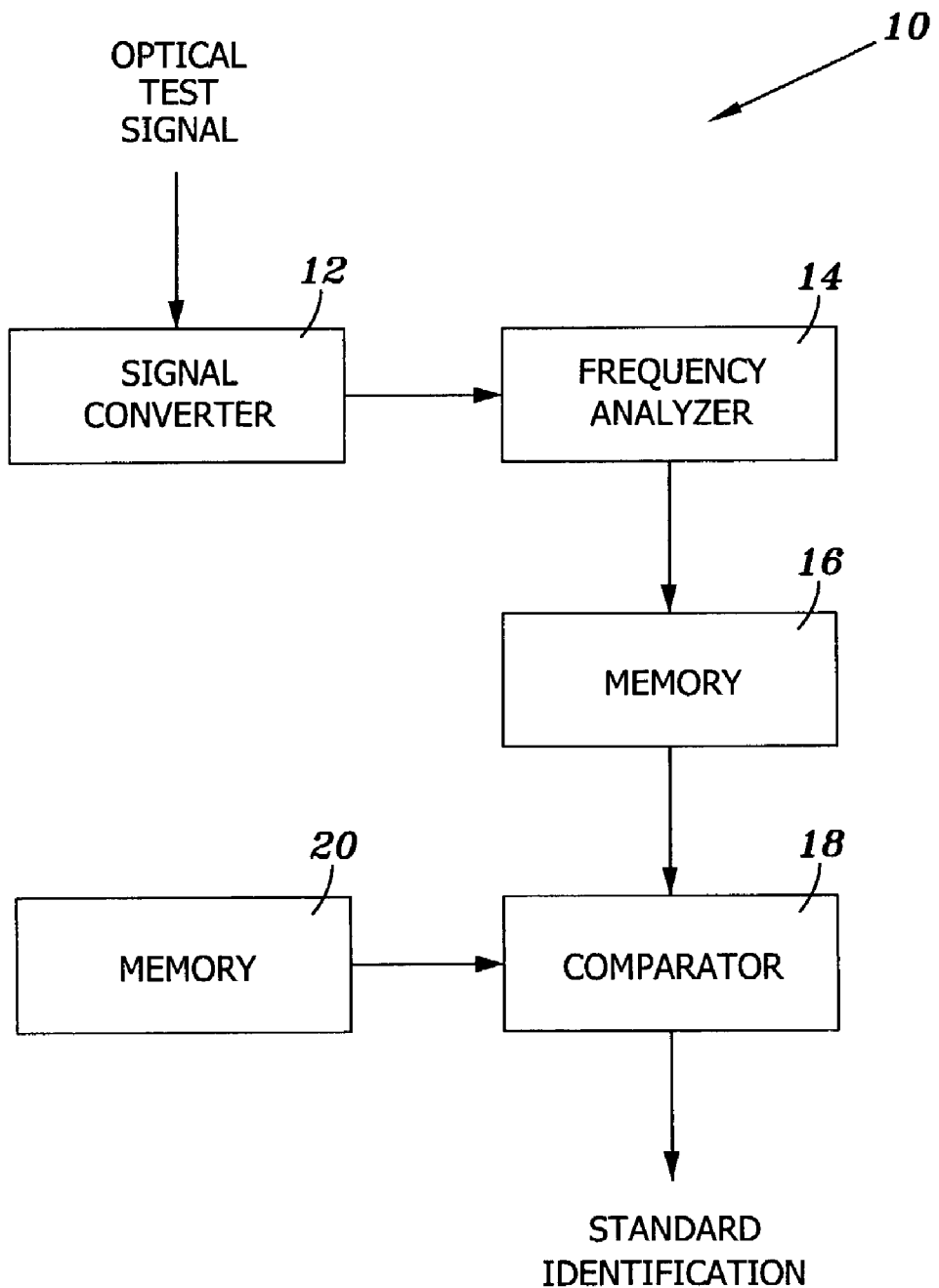

SYSTEM AND METHOD FOR CLASSIFYING HIGH SPEED DATA SIGNALS UTILIZING LOW FREQUENCY ELECTRICAL SPECTRAL CHARACTERISTICS

TECHNICAL FIELD OF THE INVENTION

The present invention relates to optical communications networks, and more particularly to a system for classifying high-speed data signals to determine an optical data transmission standard.

BACKGROUND OF THE INVENTION

Optical communications networks utilize various optical data transmission standards using different coding schemes. Such standards include, for example, SONET, G.709 FEC, and FF64 FEC. In the operation of optical switches within such optical communications networks, it is desirable to pre-identify the type of data to be switched.

The classification of a high speed data signal generally involves performing a bit-level signal analysis. The clock and data signal is recovered and a bit-wise analysis of the data stream is performed. Additionally, an identification tone may be applied to a signal at its transmission source and the tone recovered and any information transferred therein. Recovery of high-speed data is a complex process as well as being expensive. Use of the identification tone requires that a transmitter be specifically engineered to add this functionality to the communications network. This solution is not viable when working with transmitters from multiple suppliers.

Therefore, a need exits for a system for classifying a high-speed data signal in an optical communications network which is inexpensive, easy to implement and uses information from existing transmission standards with no special signal conditioning.

SUMMARY OF THE INVENTION

In accordance with the present invention, a system for identifying transmission rates of an optical signal transmitted in an optical communication network is provided. The system includes a signal converter for converting a sample of the optical signal to an electrical signal. A frequency analyzer analyzes the electrical signal to determine energy levels of the signal at predetermined frequencies. The detected energy levels are stored in a first memory device. A second memory device stores known energy levels at predetermined frequencies for a plurality of known optical transmission standards.

A comparator receives the detected energy levels stored in the first memory device and compares this information to the known transmission standards stored in the second memory device in order to identify the data transmission standard of the optical signal.

DESCRIPTION OF THE DRAWINGS

For a more complete understanding of the present invention and for further advantages thereof, reference is now made to the following Description of the Preferred Embodiments taken in conjunction with the accompanying drawing which is a block diagram of the present system.

DESCRIPTION OF THE PREFERRED EMBODIMENT

Referring to the FIGURE, a block diagram of the present system for classifying high-speed data signals is illustrated, and is generally identified by the numeral 10. System 10 is utilized for classifying or identifying and optical data transmission standard of an optical signal transmitted in an optical communications network. Since each standard uses a different coding scheme, depending on the data rate and coding scheme, each transmission standard has a unique low-frequency spectral fingerprint or characteristic. The present system analyzes the spectral fingerprint in order to deduce the data rate and transmission standard of an optical signal. An optical signal whose data transmission standard is unknown, is applied to a signal converter 12. Signal converter 12 may comprise, for example, a photodiode and converts the optical domain of the optical signal into an electrical signal. The output of converter 12 is applied to a frequency analyzer 14. Frequency analyzer 14 performs a spectral analysis on the electrical signal, such that the spectral power at key frequencies is measured and recorded. By analyzing the electrical signal at predetermined frequencies, and determining the energy level at these frequencies, a determination can be made whether a repetitive peak exists which is characteristic of a specific optical data transmission standard. Frequency analyzer 14 may include a multiple stage filter which is programmable for detecting energy at specific frequencies of the electrical signal.

The results of the frequency analysis performed by analyzer 14 is stored in a memory 16. The output of memory 16 is applied to a comparator 18. Comparator 18 also receives the information stored in a memory 20. Memory 20 stores known characteristics of multiple data transmission standards including frequency signal strength at predetermined frequency locations for each known standard. Comparator 18 functions to compare the data stored in memory 16 representing the unknown standard to each of the known data transmission standards stored in memory 20 to identify the unknown standard.

Comparator 18 may include a set of confidence indices such that the comparison process must achieve a confidence index greater than a predetermined threshold to reach a positive identification of the transmission standard.

It therefore can be seen that the present system requires only low-frequency spectral analysis in order to classify or identify a high-speed data signal based upon a comparison to known optical data transmission standards. No bit-level signal analysis or special signal conditioning is required in order to perform the standard identification.

Whereas the present invention has been described with respect to specific embodiments thereof, it will be understood that various changes and modifications will be suggested to one skilled in the art and it is intended to encompass such changes and modifications as fall within the scope of the appended claims.

The invention claimed is:

1. A system for identifying a data transmission standard of a high-speed data signal transmitted as an optical signal transmitted in an optical communications network comprising:
   a signal converter for converting a sample of the optical signal to an electrical signal;
   a frequency analyzer for receiving said electrical signal and for determining energy levels of the electrical signal at a plurality of predetermined electrical frequencies;

a first memory device for storing said detected energy levels at said predetermined electrical frequencies of said electrical signal;

a second memory device for storing known energy levels at a plurality of predetermined electrical frequencies characteristic of a plurality of known optical transmission standards; and a comparator for comparing said detected energy levels of said electrical signal stored in said first memory to said known energy levels stored in said second memory for identifying a transmission standard of the high-speed data signal transmitted as the optical signal when a match is detected.

2. A method for identifying a data transmission standard of high-speed data signal transmitted as an optical signal transmitted in an optical communications network comprising:

converting a sample of the optical signal to an electrical signal;

determining energy levels of the electrical signal at a plurality of predetermined electrical frequencies;

storing the detected energy levels at the predetermined electrical frequencies of the electrical signal;

storing known energy levels at a plurality of predetermined electrical frequencies characteristic of a plurality of known optical transmission standards; and comparing the detected energy levels of the electrical signal stored in the first memory to the known energy levels stored in the second memory for identifying a transmission standard of the high-speed data signal transmitted as the optical signal when a match is detected.

3. The method of claim 2, wherein the step of comparing includes providing a confidence index for identifying the transmission standard.

* * * * *